Sept. 20, 1927.

F. B. MILLER 1,643,000

APPARATUS FOR MINING

Filed July 31, 1926

Inventor:
FREDERICK B. MILLER,
by D. Anthony Usina
his Attorney.

Sept. 20, 1927.  
F. B. MILLER  
1,643,000  
APPARATUS FOR MINING  
Filed July 31, 1926  
10 Sheets-Sheet 3

Fig. 8.

Sept. 20, 1927.  1,643,000
F. B. MILLER
APPARATUS FOR MINING
Filed July 31, 1926    10 Sheets-Sheet 9

Sept. 20, 1927.

F. B. MILLER

APPARATUS FOR MINING

Filed July 31, 1926     10 Sheets-Sheet 10

1,643,000

Witnesses:

Inventor:
FREDERICK B. MILLER,
his Attorney.

Patented Sept. 20, 1927.

1,643,000

UNITED STATES PATENT OFFICE.

FREDERICK B. MILLER, OF SCOTTDALE, PENNSYLVANIA.

APPARATUS FOR MINING.

Application filed July 31, 1926. Serial No. 126,260. REISSUED

This invention relates to a machine for longwall mining, and more particularly to a machine adapted for use in areas having a comparatively poor roof.

One of the objects of the present invention is to provide an apparatus capable of carrying out a method of mining in which the roof is amply supported and in which two longwall faces are alternately advanced, so that the apparatus may be repositioned on one face while the other face is being worked, thus providing a constant supply of mined coal.

Another object is to provide a novel form of mining machine which will undercut, break down, trim the face and load the coal.

Another object is to provide a mining machine having a novel three-point suspension or support, two of which are on the longwall face conveyer, whereby the machine is guided, and advancing of the machine is facilitated.

Other and various objects and advantages will be apparent from the following specification and claims.

Figure 1:
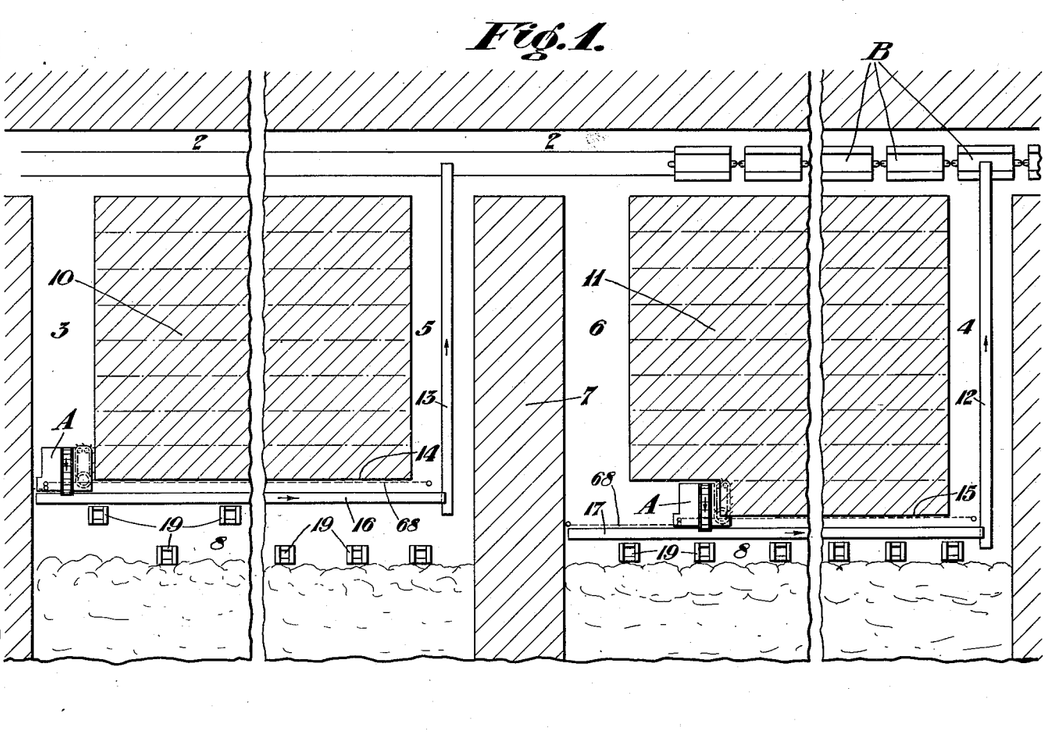
Figure 1 is a plan view of an area of coal developed by the practice of the present method.

Referring more particularly to Figure 1 of the drawings, a haulageway or heading 2 is first cut through the area to be mined. Transverse headings 3 and 4 extending at right angles to the heading 2 are then cut at each end of the area to be mined, and a second pair of transverse headings 5 and 6 extending parallel to the headings 3 and 4 are then cut through the area to be mined adjacent its center. The headings 5 and 6 are spaced apart to leave a safety barrier 7 of coal therebetween. A second haulageway and working space heading 8 is then cut along the rear side of the area to be mined and extends parallel to the heading 2. The headings 3 and 4, and 5 and 6 communicate at their opposite ends with the headings 2 and 8 forming connecting headings, and the combination of headings leaves two sub-areas 10 and 11 to be mined by the novel longwall method of this application.

Heading conveyers 12 and 13 of any standard type are provided in the headings 4 and 5, respectively, to convey the mined coal from the heading or space 8 forwardly into the heading 2 where it may be discharged into suitable cars B for transportation out of the mine.

The rear faces of the sub-areas 10 and 11 form longwall faces 14 and 15, respectively, which are to mined. Drag conveyers 16 and 17 are mounted in the spaces 8 and extend parallel with the longwall faces 14 and 15, respectively. The conveyers 16 and 17 have channel beam base members 18 of rigid construction, and are adapted to be moved upwardly toward the longwall faces as the mining progresses.

A plurality of movable roof supporting cribs 19 are arranged along the rear side of the headings or spaces 8 and are adapted to support the roof and to be moved forwardly as the mining progresses.

Mining machines A, to be described, are positioned along the left side faces of the sub-areas 10 and 11 and are mounted to travel on the drag conveyers 16 and 17, respectively, in a direction parallel to the longwall faces 14 and 15. The machines A are adapted to undercut, break down and load the coal being mined onto the conveyers 16 and 17.

In carrying out the method, the mining machine A is positioned along the left end face of the sub-area 10, is first started across the longwall face 14 and mines a short end face along the entire longwall face. As the coal is mined the machine loads it onto the drag conveyer 16, which in turn conveys it along the space 8 and delivers it onto the conveyer 13, and this last named conveyer delivers the coal into the cars B in the heading 2. After the machine A has made a complete cut along the longwall face 14, it will be returned to the left-hand end face of the sub-area 10 and repositioned for a successive cut, the drag conveyer 16 and machine being advanced, and the roof cribs 19 being advanced to support the roof adjacent the longwall face while permitting the formation of a gob in the mined out area.

As soon as the machine A has finished a complete cut along the longwall face 14, a second machine A, which is positioned along the left end face of the sub-area 11, is started and mines a short end face along the entire longwall face 15, while the first machine A and associated apparatus is being repositioned. The second machine A loads the coal mined from the longwall face 15 onto the drag conveyer 17, which in turn conveys it along the heading or space 8 and delivers it onto the conveyer 12 which delivers it into the cars B in the heading 2. After the second machine A has made a complete cut across the longwall face 15, the first machine will be again started across the longwall face 14, and the second machine, the drag conveyer 17 and cribs 19 will be repositioned while the first machine is making its second cut.

The machines A will thus be alternately operated and a steady output of coal maintained.

If for any reason, one machine should fail to proceed as fast as the other, as for instance, due to breakdowns or the like, it will not interfere with the operation of the other machine, since due to the sacrifice barrier 7, each longwall face is independent of the other.

Figure 2:
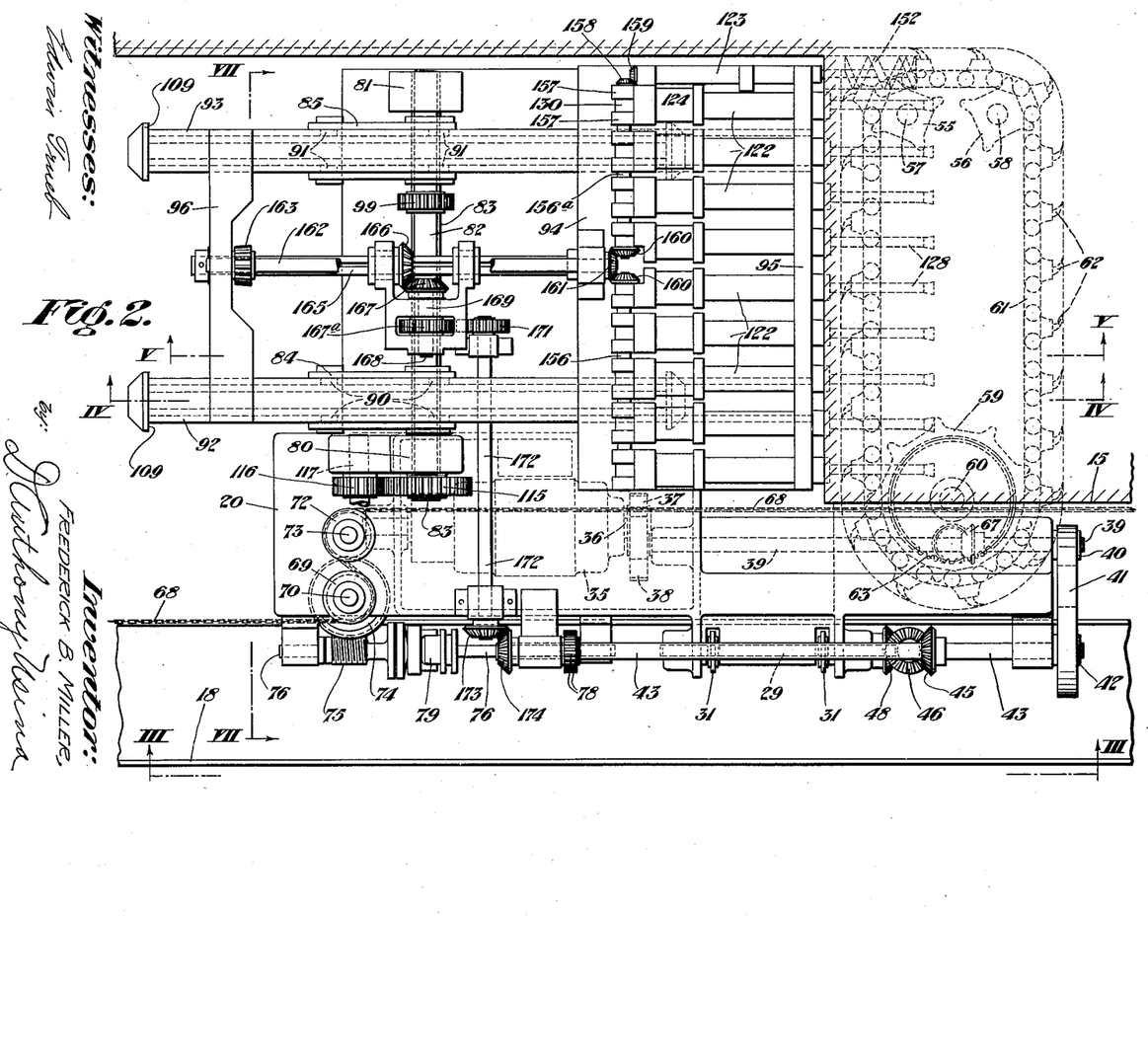
Figure 2 is a plan view of the machine used in carrying out the improved method.
Figure 3:
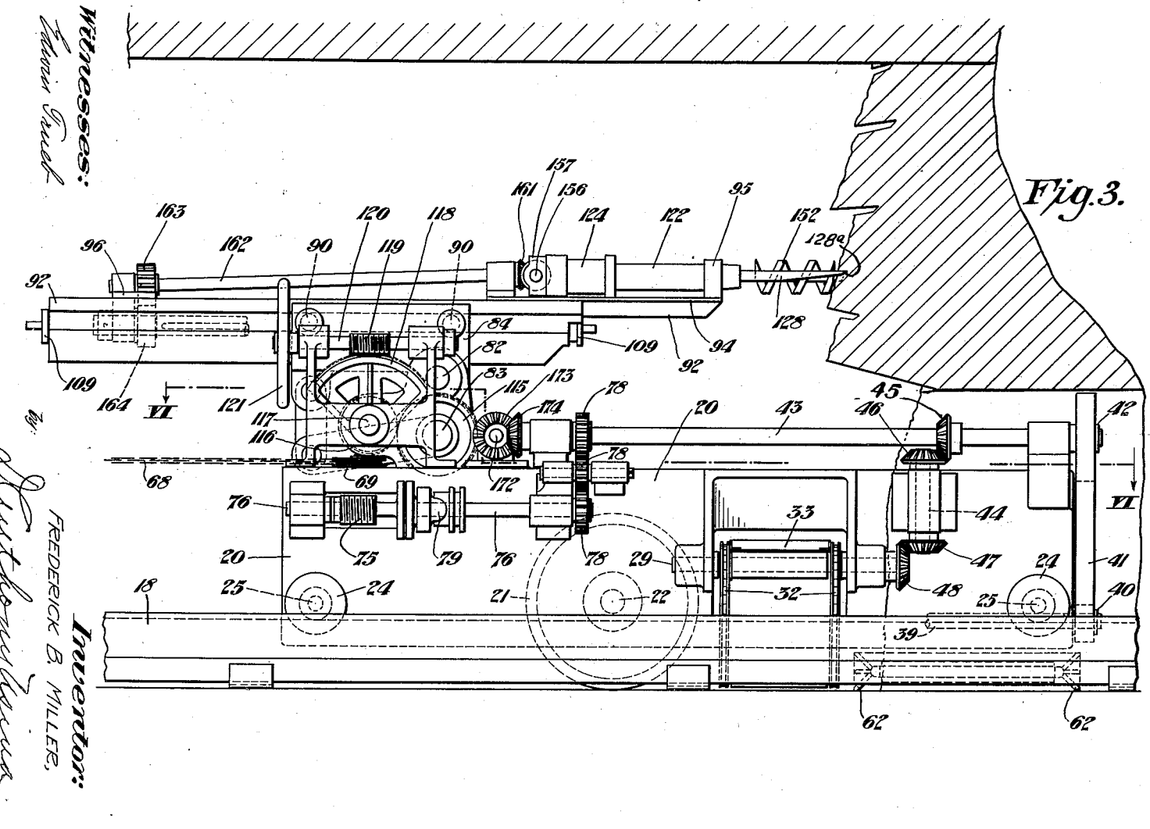
Figure 3 is a side elevation thereof taken on the line III—III of Figure 2.
Figure 4:
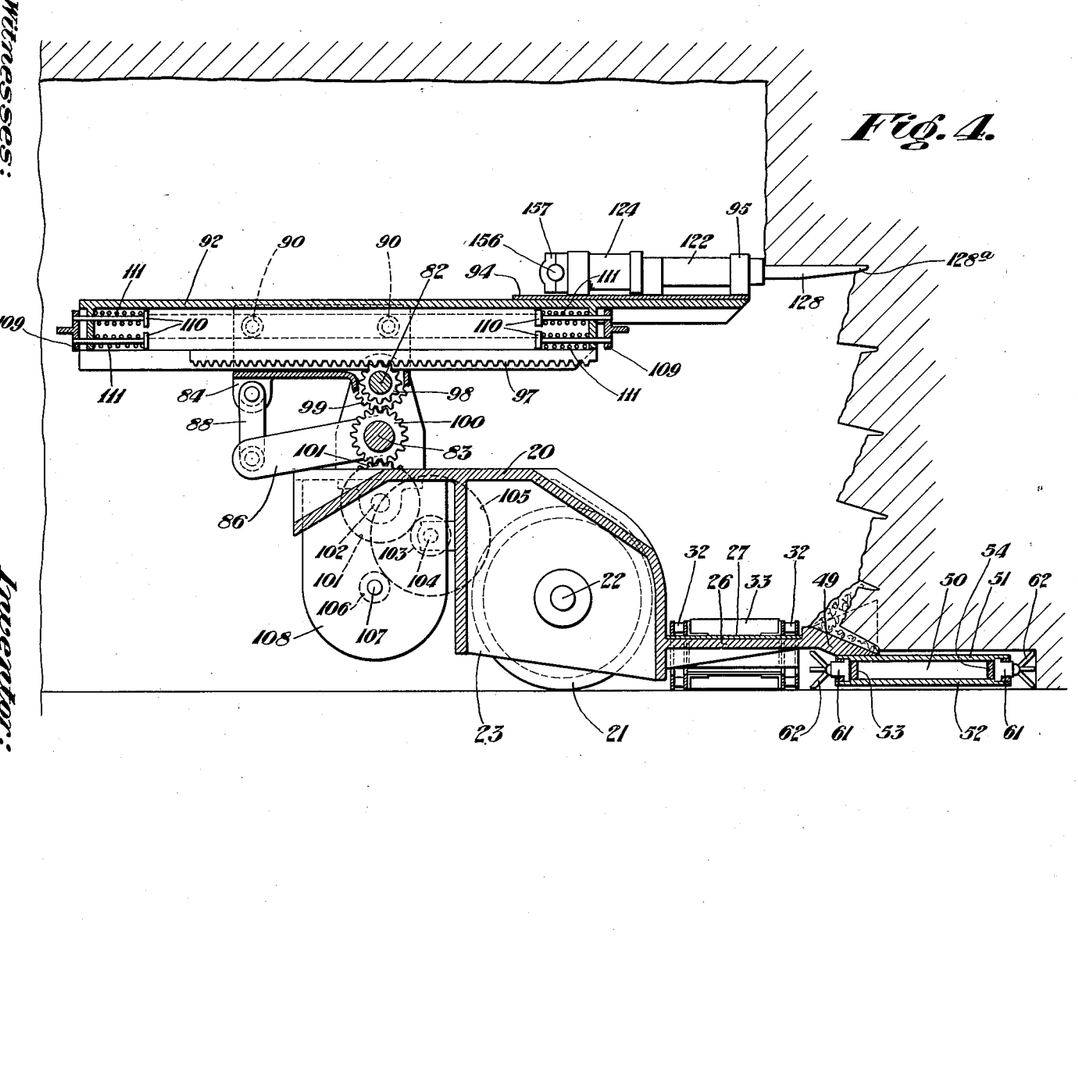
Figure 4 is a sectional elevation taken on the line IV—IV of Figure 2.
Figure 5:
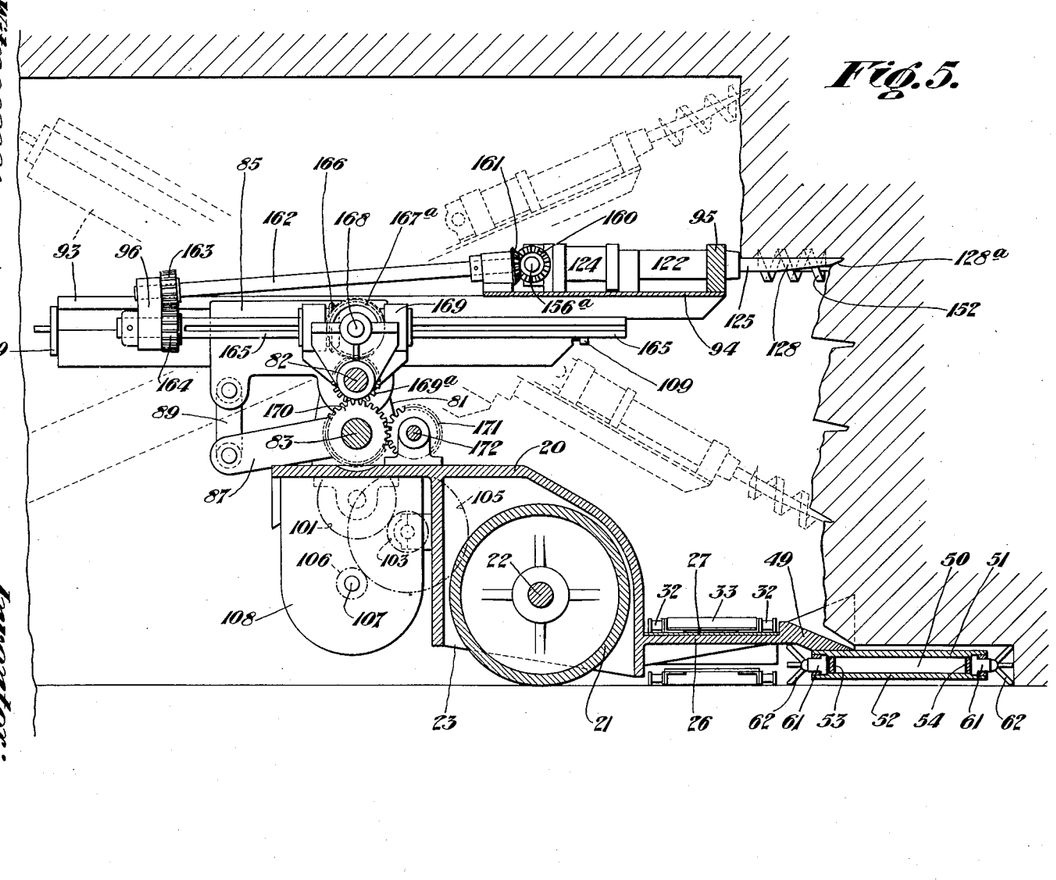
Figure 5 is a similar view taken on the line V—V of Figure 2.
Figure 6:
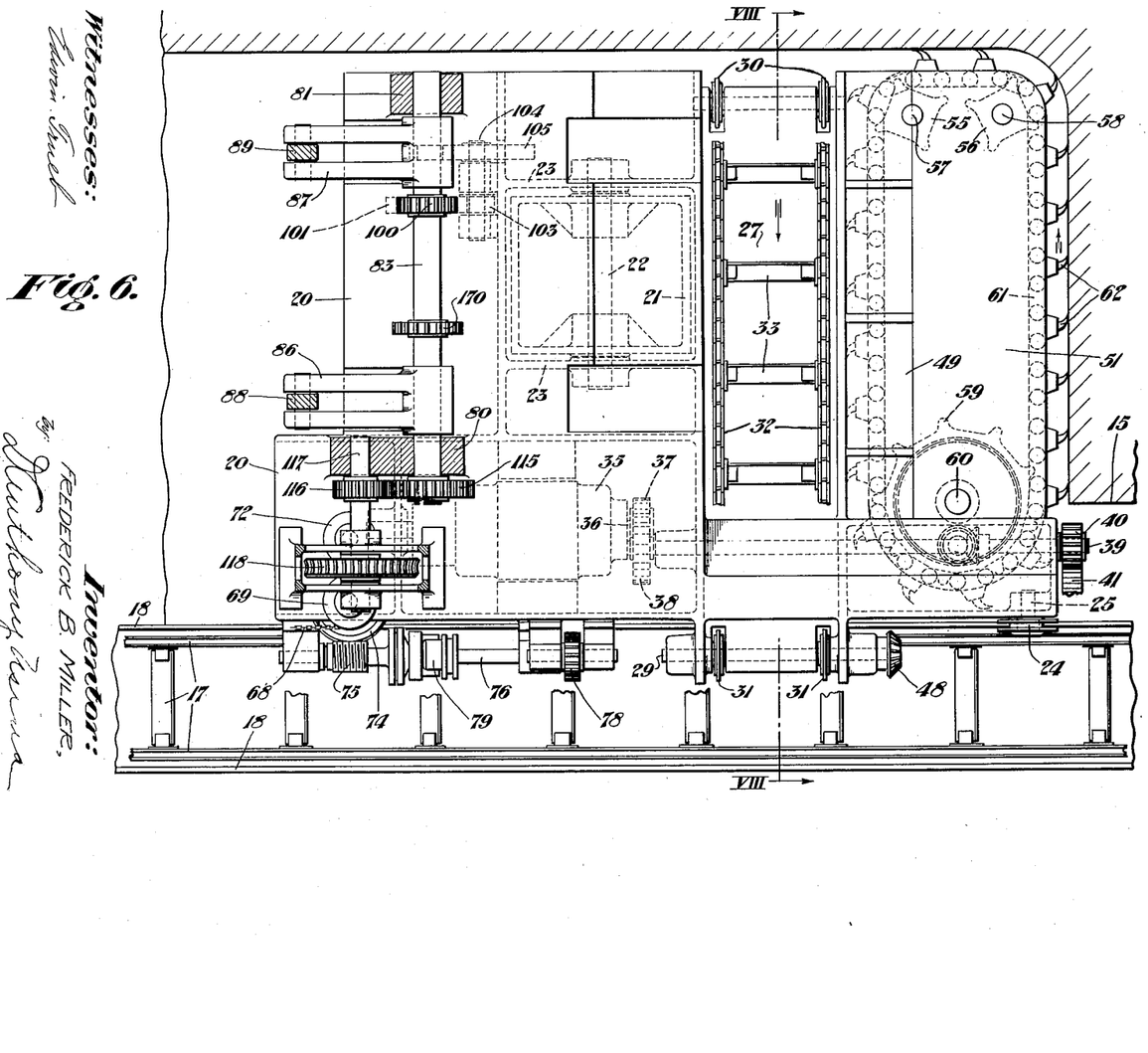
Figure 6 is a sectional plan taken on the line VI—VI of Figure 3.
Figure 7:
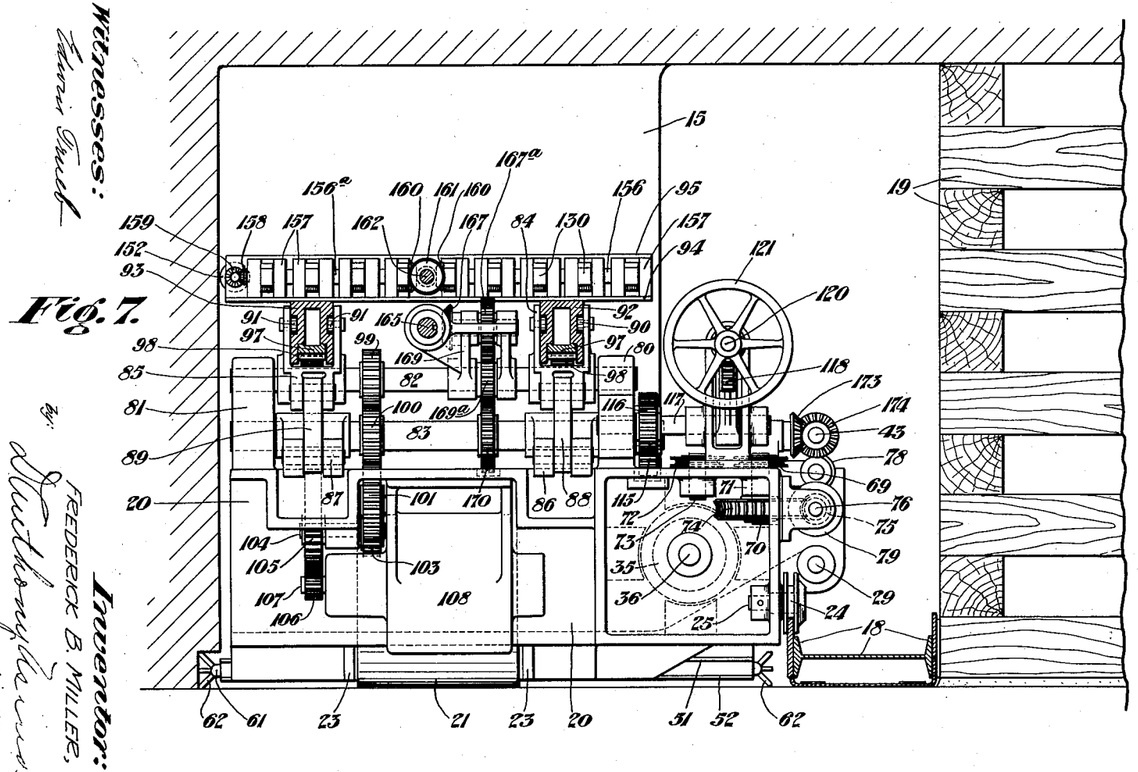
Figure 7 is a transverse sectional elevation taken on the line VII—VII of Figure 2.
Figure 8:
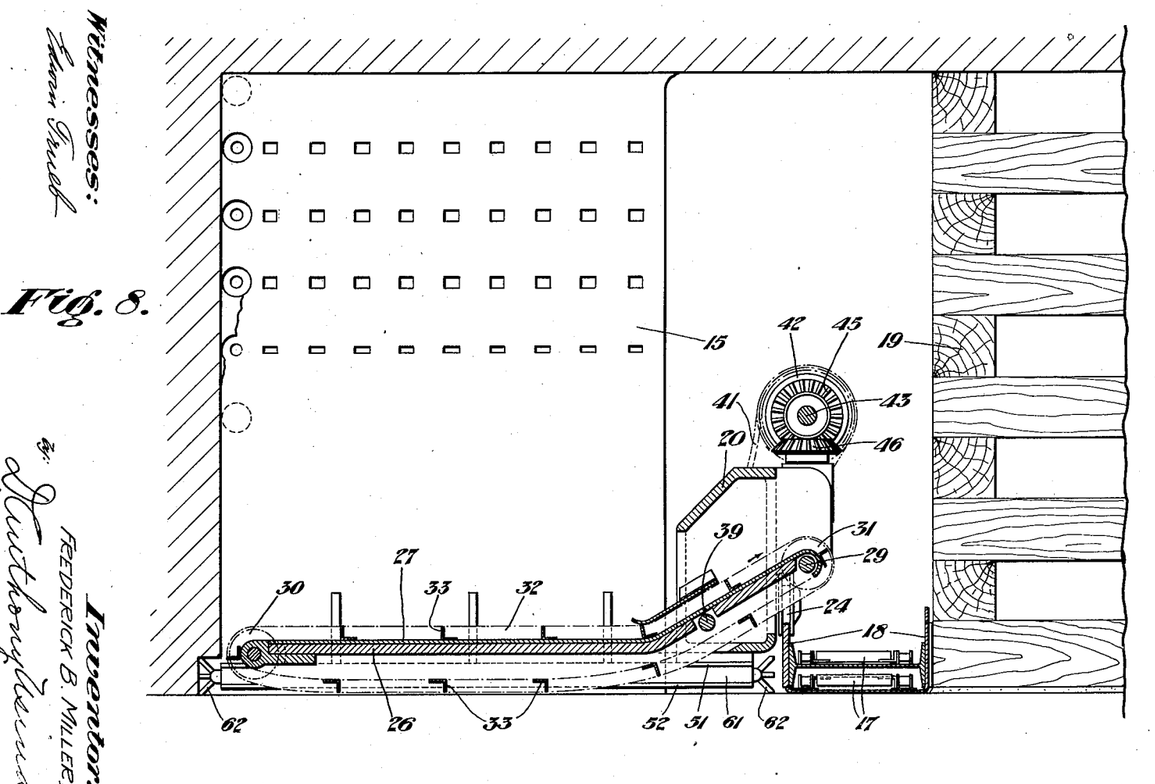
Figure 8 is a transverse sectional elevation taken on the line VIII—VIII of Figure 6.
Figure 9:
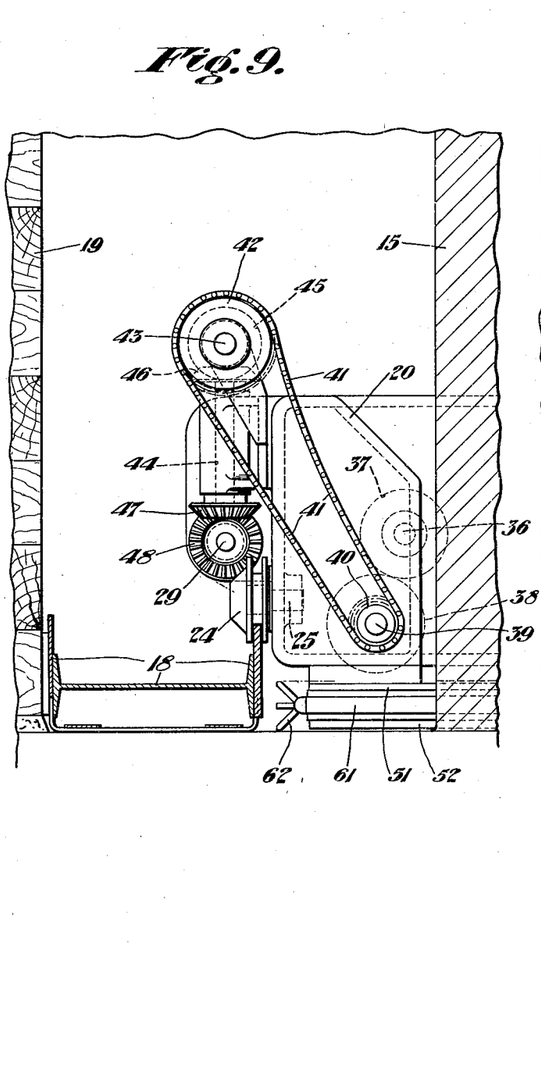
Figures 9 and 10 are fragmentary detail elevations showing the conveyer drive gearing.

The machines A used in carrying out the method of this invention, comprise a main frame 20 having a three-point suspension or support composed of a large roller 21 journaled on an axle 22 supported by ribs 23 of the main frame and adapted to ride on the mine floor, and a pair of flanged or grooved rollers 24 journaled on stub axles 25 fixedly mounted in the side wall of the main frame 20 and adapted to be engaged on and ride on the forward flange of the channel body of the drag conveyer. The rollers 24 serve to support and guide the machine and prevent twisting, and the three-point support combines to distribute the load and eliminate tilting and cramping of the machine.

The forward end of the main frame 20 is in the form of an elevated platform 26 and forms the base or pan for a transverse drag conveyer for transporting or conveying the mined coal across the machine onto the drag conveyers 16 and 17 in the headings or spaces 8. A wear plate 27 is mounted on the top of the platform 26, and shafts 28 and 29 are journaled in suitable bearings at the opposite ends of the platform. Idler sprockets 30 are mounted on the shaft 28, while the shaft 29 is the power or head shaft and carries the head or power sockets 31. Suitable conveyer chains 32 are trained over the sprockets 30 and 31 and have drag bars 33 secured thereto for dragging or conveying the coal along the platform 26. The rear or head end of the platform 26 is elevated or inclined so as to deliver the coal onto conveyers 16 and 17.

The head shaft 29 receives its power from a motor 35 which has its armature shaft 36 connected by gears 37 and 38 to a power shaft 39, which shaft carries a sprocket 40 connected by a chain 41 to a sprocket 42 on a drive shaft 43. A vertical shaft 44 is journaled in the frame 20 and is connected to the shaft 43 by miter gears 45 and 46, and to the head shaft 29 by miter gears 47 and 48.

The forward end of the platform 26 terminates in an inclined portion 49 and supports a platform conveyer portion 50 which is rigidly secured thereto and is composed of top and bottom plates 51 and 52 connected and held in spaced relation by cutter chain guides 53 and 54 along each longitudinal edge.

A pair of idler sprockets 55 and 56 are journaled on short shafts 57 and 58 between the plates 51 and 52 at one end of the member 50, and a head or power sprocket 59 is journaled on a shaft 60 at the other end of the member 50.

A cutter chain 61, carrying cutter bits 62, is trained around the sprockets 55, 56 and 59 and in the guides 53 and 54, and is adapted to be operated to undercut and form a kerf in the coal to be mined.

Figure 10:
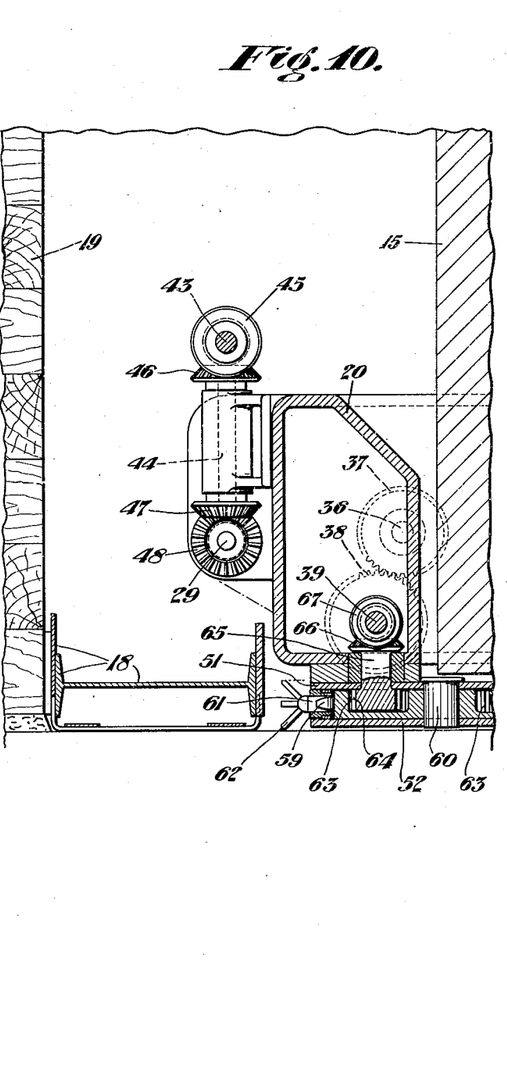

The head sprocket 59 has an internal gear 63 formed integral therewith, (see Figure 10) which is in mesh with a pinion 64 on a shaft 65 journaled in the platform conveyer 50. The shaft 65 carries a miter gear 66 which is in mesh with a miter gear 67 on the shaft 39.

The coal being mined after being undercut by the cutter chain 61 is broken down by a plurality of picking bars (to be described) and falls onto the platform conveyer portion 50. As the machine is advanced the broken down coal will be pushed over or across the portion 50 and up over the inclined portion 49 onto the drag conveyer platform or pan 26 where it will be engaged by the drag bars 33 and moved transversely onto the drag conveyer in the headings 8.

The machine A is adapted to be fed toward or into the material to be mined by an anchored feed chain 68 which is anchored to suitable anchors of any well-known type (not shown), and is meshed with a feedwheel 69 keyed to a shaft 70 journaled in a bearing 71 integral with the frame 20. A guide-wheel 72 is keyed to a stud shaft or pin 73 journaled in the frame 20 and the chain 68 is trained over the guide-wheel 72 to hold the chain in engagement or mesh with the feed-wheel 69. The shaft 70 carries a worm-wheel 74 which is in mesh with a worm 75 loosely mounted on a shaft 76, which shaft is connected by gears 78 with the drive shaft 43. A slip clutch 79 is provided on the shaft 76 for connecting the worm 75 therewith to drive the machine.

A pair of spaced upright supporting brackets or bearings 80 and 81 are mounted on the frame 20 and a pair of horizontal shafts 82 and 83 are journaled therein. A pair of carriage guide members 84 and 85 are pivotally mounted at their forward ends on the shaft 82, and a pair of arms 86 and 87 are keyed at their forward ends to the shaft 83 and have their rear ends connected by links 88 and 89, respectively, to the respective carriage guides 84 and 85, so that rotation of the shaft 83 will cause a swinging movement of the carriage guides 84 and 85 about the shaft 82.

The guides 84 and 85 are provided with rollers 90 and 91, respectively, on which the ram bars 92 and 93 forming the sides of the carriage, are mounted. The ram bars 92 and 93 are tied together to complete the carriage by a base plate 94, and cross members 95 and 96. The ram bars 92 and 93 are adapted to reciprocate on the rollers 90 and 91 and are provided with rack portions 97 which are in mesh with pinions 98 keyed to the shaft 82. The shaft 82 is provided with a pinion 99 which meshes with an idler pinion 100 on the shaft 83, which in turn is in mesh with a gear 101 on a stub shaft 102 journaled in the main frame. Gear 101 meshes with a pinion 103 on a stub shaft 104, which also carries a gear 105 which is meshed with a pinion 106 on the armature shaft 107 of a torque motor 108. From the above it will be readily seen that operation of the motor 108 will feed the carriage forward under a constant torque.

The carriage ram bars 92 and 93 are provided with shock absorbers at each end to limit the travel of the carriage in both directions, which comprise a stop member 109 tapped for the reception of threaded bolts 110 which are inserted through compression springs 111, which are seated against the ends of the bars 92 and 93. The stop members 109 project beyond the sides of the bars 92 and 93 and are adapted to engage the guides 84 and 85 to limit the movement of the carriage.

The carriage and carriage guides are adapted to be rocked about the shaft 82 by the operation of the shaft 83, which shaft is rocked by means of power transmitted through a gear 115 meshed with a gear 116 on a shaft 117.

The shaft 117 carries a worm-quadrant 118 which is meshed with a worm 119 on a shaft 120, which shaft also carries a hand wheel 121 by which the shaft may be rotated by the operator.

The weight of the carriage is so distributed that when it is in its backward position, the center of gravity is on or near its axis, which makes it possible to lower or elevate the carriage quickly with little effort.

A plurality of mechanical hammers or picking bars 122 and an auger 123 are arranged parallel in a horizontal plane on the tilting and movable carriage above described.

Figure 12:
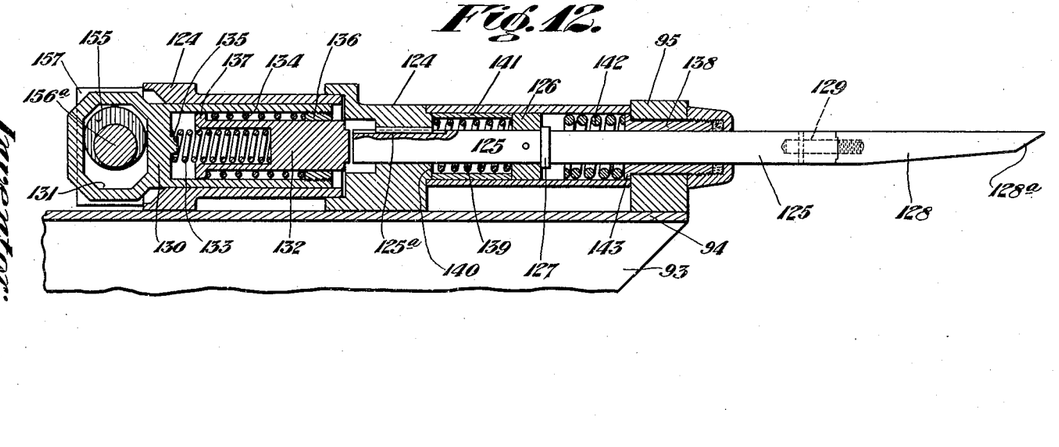
Figure 12 is a sectional elevation through the picking bar of Figure 11 taken on the line XII—XII.

The mechanical hammers or picking bars each comprise a housing 124 fixed to the above described carriage, a pick shank 125 reciprocably mounted in said housing and provided with a guide collar 126 abutting a shoulder 127. The pick shank 125 is splined at 125$^a$ to the housing to prevent rotation. A pick bit 128 having a wedge-shaped end 128$^a$ is secured to the forward end of the shank 125 by a threaded pin 129. A cylinder 130 is reciprocably mounted in the rear end of the housing 124 and provided with a cam receiving recess 131. A helve or hammer 132 is reciprocably mounted in the cylinder 130 and is positioned between springs 133 and 134. The rear end of the hammer 132 is recessed to receive one end of the coiled spring 133, and the other end of the spring is positioned over a guide protuberance 135 on the cylinder 130, so that the spring 133 is compressed at each backward stroke of the hammer 132. A guide bushing 136 is threaded in the forward end of the cylinder 130 and the rear end of the hammer 132 is provided with a flange 137 so as to guide the hammer within the cylinder, and the spring 134 is mounted between the bushing 136 and the flange 137, so that it is compressed on each forward stroke of the hammer 132.

The forward end of the pick shank 125 is guided by a bushing 138. A coiled spring 139 is mounted around the pick shank 125 between the collar 126 and a shoulder 140 of the housing and is adapted to absorb the initial thrust of the pick against the coal face. A stop piece 141 extends between the collar 126 and shoulder 140 so as to limit the movement of the shank 125.

A second coiled spring 142 is mounted around the shank 125 and extends between the collar 126 and a washer 143 bearing against the forward end of the housing and serves to absorb the unspent force of the shank.

Figure 11:
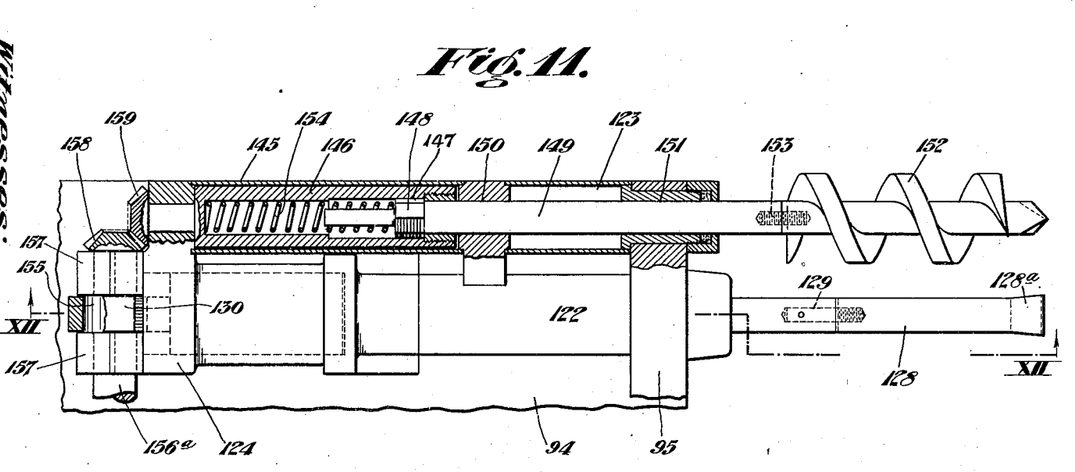
Figure 11 is a fragmentary enlarged plan showing the auger and picking bar next to the auger.

At the extreme left end of the row of hammers 122 is mounted the auger 123 which comprises a housing 145 fixed to the movable carriage and having a hollow shaft 146 journaled therein. The forward end of the shaft 146 is machined to form a hexagon recess 147 to receive the hexagon end 148 of an auger shank 149 journaled at 150 and 151 in the housing 145. The end 148 of the shank 149 is materially shorter than the recess 147 so as to permit a longitudinal movement of the auger shank. An auger 152 is secured to the free forward end of the shank 149 by a threaded pin 153. A coiled spring 154 is mounted in the hollow shaft 146 and bears against the rear end of the auger shank 149 so as to normally force the auger shank and auger forward into the coal face, and also permit the auger to move rearwardly against the pressure of the spring if the picks penetrate with greater rapidity than the auger.

The auger 123 is adapted to bore a relief hole in the coal face to relieve the extreme left picking bar and aid in separating the coal along the longwall face. In addition to the above function, the auger serves to break or shear off any projecting points of the coal remaining on the longwall face after the picking bars have broken down the coal. The auger 123 has a fixed position relative to the longwall face and, therefore, when the carriage is rocked vertically about the shaft 83 to re-position the picking bars and auger, the auger will strike and shear off any projecting points so as to form a smooth longwall face.

The hammers or picking bars 122 are adapted to be operated by cams 155 formed integral with cam shafts 156 and 156ᵃ journaled in bearings 157 in the picking bar housings 124. The cams 155 are adapted to engage the walls of the cam recesses 131 in the cylinders 130 of the picking bars and reciprocate the cylinders.

The cam shaft 156ᵃ has a miter gear 158 on its one end which meshes with a miter gear 159 on the rear end of the hollow shaft 146 of the auger 123, so that as the cam shaft 156ᵃ is rotated the auger 123 will be operated.

Each of the shafts 156 and 156ᵃ is provided with a miter gear 160, which gears are in mesh with a miter gear 161 on a shaft 162 journaled on the carriage. The shaft 162 carries a gear 163 in mesh with a gear 164 on a shaft 165 journaled on the carriage, which shaft has a beveled or miter gear 166 splined thereon so as to permit the shaft to move relative thereto. The gear 166 is meshed with a gear 167 on a shaft 168 journaled in a frame 169. The shaft 168 carries a gear 167ᵃ which is in mesh with a gear 169ᵃ loosely mounted on the shaft 82 and in mesh with a gear 170 loosely mounted on the shaft 83. The gear 170 is meshed with a gear 171 on a shaft 172, which shaft carries a gear 173 which is meshed with a gear 174 on the drive shaft 43.

In operation, the torque motor feeds the carriage, carrying the picking bars 122 and auger 123 forward toward the coal face to be mined, so as to thrust the pick bits 128 against the face compressing the springs 139. The cam shafts 156 and 156ᵃ being constantly rotating, the cams 155 will engage and reciprocate the cylinders 130, which impart a reciprocatory movement to the hammers 132 through the springs 133 and 134, which springs lend impetus to the hammers at the time of contact with the pick shanks 125. The blows of the hammers assisted by the springs 139 drive the pick bits into the coal. The springs 139 also serve to keep the pick bits seated in the coal after penetration. If, for any reason, the pick bits fail to penetrate from the effect of the hammer blow, compression of the spring 133 permits rotation of the cam 155 of that picking bar. After the remaining picking bars have effected penetration, and the expansion of their springs 139 has taken place, a cumulative effect is had on the picking bar which has failed to penetrate whereby the bar will be forced to penetrate.

The cams 155 are spaced circumferentially around the shafts 156 and 156ᵃ so that only one of the cams is engaged at its working point with the pick cylinder 130 at a time, so that the picking bars are successively thrust into the coal face.

A machine as described above is particularly adapted for carrying out the method of longwall mining described in the forepart of this specification, whereby the coal is mined over a shortwall face extending at right angles to the longwall face to be worked, by undercutting, breaking down the undercut coal, trimming the successive longwall face, and simultaneously loading the mined coal.

I claim:

1. A mining machine for a longwall system of mining, comprising in combination, a rigid framed conveyer extending parallel with the longwall face to be mined, a combined undercutting, breaking down and loading machine extending at right angles to and at least partly supported on and adapted to travel longitudinally of said conveyer, said machine comprising a main frame, a supporting roller journaled on said frame and adapted to ride over the mine floor, flanged rollers journaled on said frame and supported on said conveyer, power means for moving said machine into the coal to be mined, undercutting means carried by said frame, and power operated pick mechanism carried by said frame for breaking down the undercut coal.

2. A mining machine for a longwall system of mining, comprising in combination, a rigid framed conveyer extending parallel with the longwall face to be mined, a combined undercutting, breaking down and loading machine extending at right angles to and at least partly supported on and adapted to travel longitudinally of said conveyer, said machine comprising a main frame, a supporting roller journaled on said frame and adapted to ride over the mine floor, flanged rollers journaled on said frame and supported on said conveyer, power means for moving said machine into the coal to be mined, undercutting means carried by said frame, power operated pick mechanism carried by said frame for breaking down the undercut coal, and a conveyer on said machine and extending at right angles to said first named conveyer, said last named conveyer being adapted to convey the broken down coal onto said first named conveyer.

3. A mining machine comprising a main frame, a cutter chain mounted along the forward side of said frame for undercutting the coal to be mined, a conveyer mounted to the rear of and extending parallel with said cutter chain, means for moving said machine into the coal to be mined, a carriage mounted for vertical swinging movement on said frame, a plurality of picking bars mounted on said carriage, means for moving said carriage forward under a constant pressure to force said bars against the coal face to be mined, and means for exerting a series of rapid blows against said bars to drive said bars into the coal to be mined.

4. In a mining machine having a main frame and means on said frame for undercutting the material to be mined, a carriage mounted for vertical swinging movement relative to said main frame, a plurality of picking bars mounted on said carriage, an auger mounted at one end of said carriage, means for moving said carriage forward under a constant torque to force said bars and auger against the material being mined, means for rotating said auger, and means for exerting a series of rapid blows against said picking bars to drive said bars into the material to be mined.

5. In a mining machine having a main frame and means on said frame for undercutting the material to be mined, a carriage mounted for vertical swinging movement relative to said main frame, a plurality of picking bars mounted on said carriage, an auger mounted at one end of said carriage, a constant torque motor having a geared connection with said carriage for moving said carriage forward under a constant torque to force said bars and auger against the material being mined, means for rotating said auger, and means for exerting a series of rapid blows against said picking bars to drive said bars into the material to be mined.

6. In a mining machine having a main frame and means on said frame for undercutting the material to be mined, a carriage mounted for vertical swinging movement relative to said main frame, a plurality of picking bars mounted on said carriage, a constant torque motor having a geared connection with said carriage for moving said carriage forward under a constant torque to force said bars against the material being mined, and means for exerting a series of rapid blows against said bars to drive said bars into the material to be mined.

7. In a mining machine having a main frame and means on said main frame for undercutting the material to be mined, a carriage mounted for vertical swinging movement relative to said main frame, a plurality of picking bars arranged in a single transverse row on said carriage, an auger mounted on said carriage at the extreme inner end of said row of picking bars, means for moving said carriage forward to force said picking bars and auger against the material being mined under a constant torque, means for exerting a series of rapid blows against said picking bars to force said bars into the material being mined, said means being adapted to strike blows against single ones of said bars successively from one end of the row of bars to the other, and means for rotating said auger to cause said auger to penetrate the material to be mined, said auger being adapted to shear the face at the side of said machine when said carriage is rocked.

8. In a mining machine having a main frame and means on said main frame for undercutting the material to be mined, a carriage mounted for vertical swinging movement relative to said main frame, a plurality of picking bars arranged in a single transverse row on said carriage, means for moving said carriage forward to force said picking bars against the material being mined under a constant torque, each of said picking bars comprising a bit shank mounted for reciprocatory movement on said carriage, a bit secured to said shank, a collar on said shank, a coiled spring mounted around said shank and engaged between said collar and a portion of said carriage, a housing on said carriage to the rear of said shank, a cylinder mounted for reciprocation in said housing, a hammer member mounted for reciprocatory movement in said cylinder, a second coiled spring arranged between the rear end of said cylinder and the forward end of said hammer, a third coiled spring arranged between the forward end of said cylinder and the rear end of said hammer, an operating shaft for all of said picking bars, said shaft having a plurality of cams thereon, one for each of said bars, said cams being adapted to engage the rear ends of the cylinders of said picking bars and to force said cylinders forward so as to compress said second named springs and reciprocate said hammers so that said hammers will strike said bit shanks, said springs adding impetus to said hammers, and means for operating said shaft.

9. In a mining machine having a main frame and means on said main frame for undercutting the material to be mined, a carriage mounted for vertical swinging movement relative to said main frame, a plurality of picking bars arranged in a single transverse row on said carriage, each of said picking bars comprising a bit shank mounted for reciprocatory movement on said carriage, a bit secured to said shank, a collar on said shank, a coiled spring mounted around said shank and engaged between said collar and a portion of said carriage, a housing on said carriage to the rear of said shank, a cylinder mounted for reciprocation in said housing, a hammer member mounted for reciprocatory movement in said cylinder, a second coiled spring arranged between the rear end of said cylinder and the forward end of said hammer, a third coiled spring arranged between the forward end of said cylinder and the rear end of said hammer, means for moving said carriage forward under a constant torque so as to force said picking bars into the coal being mined and compressing said first named springs, an operating shaft for all of said picking bars, said shaft having a plurality of cams thereon, one for each of said bars, said cams being adapted to engage the rear ends of cylinders of said picking bars and to force said cylinders forward so as to compress said second named springs and reciprocate said hammers so that said hammers will strike said bit shanks, said last named springs adding impetus to said hammers, and said first named springs assisting in forcing said bits into the coal, and means for operating said shaft.

In testimony whereof, I have hereunto signed my name.

FREDERICK B. MILLER.